United States Patent
Bridgford et al.

(10) Patent No.: US 8,539,254 B1
(45) Date of Patent: Sep. 17, 2013

(54) METHOD AND INTEGRATED CIRCUIT FOR PROTECTING AGAINST DIFFERENTIAL POWER ANALYSIS ATTACKS

(75) Inventors: Brendan K. Bridgford, New Haven, CT (US); Jason J. Moore, Albuquerque, NM (US); Stephen M. Trimberger, San Jose, CA (US); Eric E. Edwards, Albuquerque, NM (US)

(73) Assignee: Xilinx, Inc., San Jose, CA (US)

( * ) Notice: Subject to any disclaimer, the term of this patent is extended or adjusted under 35 U.S.C. 154(b) by 474 days.

(21) Appl. No.: 12/791,608

(22) Filed: Jun. 1, 2010

(51) Int. Cl.
*H04L 29/06* (2006.01)

(52) U.S. Cl.
USPC .......... 713/194; 713/100; 713/187; 713/330; 726/17; 726/21

(58) Field of Classification Search
USPC ................ 713/100, 187, 194, 330; 726/17, 726/21
See application file for complete search history.

(56) References Cited

U.S. PATENT DOCUMENTS

| | | | |
|---|---|---|---|
| 5,497,462 A * | 3/1996 | Schrenk ................. | 714/700 |
| 5,598,424 A | 1/1997 | Erickson et al. | |
| 6,118,869 A * | 9/2000 | Kelem et al. ............. | 380/44 |
| 6,181,164 B1 | 1/2001 | Miller | |
| 6,188,766 B1 | 2/2001 | Kocher | |
| 6,278,783 B1 | 8/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,366,117 B1 | 4/2002 | Pang et al. | |
| 6,381,699 B2 | 4/2002 | Kocher et al. | |
| 6,510,518 B1 | 1/2003 | Jaffe et al. | |
| 6,539,092 B1 | 3/2003 | Kocher | |
| 6,640,305 B2 | 10/2003 | Kocher et al. | |
| 6,654,884 B2 | 11/2003 | Jaffe et al. | |
| 6,931,543 B1 * | 8/2005 | Pang et al. ................... | 713/193 |
| 6,978,370 B1 | 12/2005 | Kocher | |
| 7,039,816 B2 | 5/2006 | Kocher et al. | |
| 7,254,800 B1 * | 8/2007 | Trimberger ................. | 716/117 |
| 7,305,047 B1 * | 12/2007 | Turner ......................... | 375/316 |
| 7,506,165 B2 | 3/2009 | Kocher et al. | |
| 7,516,479 B2 * | 4/2009 | Kurita ............................. | 726/2 |
| 7,587,044 B2 | 9/2009 | Kocher et al. | |
| 7,599,488 B2 | 10/2009 | Kocher et al. | |
| 7,607,025 B1 | 10/2009 | Trimberger | |
| 7,634,083 B2 | 12/2009 | Kocher et al. | |

(Continued)

OTHER PUBLICATIONS

U.S. Appl. No. 12/791,668, filed Jun. 1, 2010, Trimberger, Stephen M., Xilinx, Inc. 2100 Logic Drive, San Jose, CA 95124 USA.

(Continued)

*Primary Examiner* — Carl Colin
*Assistant Examiner* — Gary Lavelle
(74) *Attorney, Agent, or Firm* — LeRoy D. Maunu

(57) ABSTRACT

In one embodiment of the invention, a method is provided for protecting against attacks on security of a programmable integrated circuit (IC). At least a portion of an encrypted bitstream input to the programmable IC is decrypted with a cryptographic key stored in the programmable IC. A number of failures to decrypt the encrypted bitstream is tracked. The tracked number is stored in a memory of the programmable IC that retains the number across on-off power cycles of the programmable IC. In response to the number of failures exceeding a threshold, data that prevents the decryption key from being used for a subsequent decryption of a bitstream is stored in the programmable IC.

16 Claims, 6 Drawing Sheets

(56) References Cited

U.S. PATENT DOCUMENTS

| | | |
|---|---|---|
| 7,668,310 B2 | 2/2010 | Kocher et al. |
| 7,787,620 B2 | 8/2010 | Kocher et al. |
| 7,792,287 B2 | 9/2010 | Kocher et al. |
| 7,941,666 B2 * | 5/2011 | Kocher .................. 713/172 |
| 2001/0002486 A1 | 5/2001 | Kocher et al. |
| 2001/0053220 A1 | 12/2001 | Kocher et al. |
| 2002/0099948 A1 | 7/2002 | Kocher et al. |
| 2003/0028771 A1 | 2/2003 | Kocher et al. |
| 2005/0151777 A1 * | 7/2005 | Silverbrook ............... 347/19 |
| 2005/0212656 A1 * | 9/2005 | Denison et al. .......... 340/5.73 |
| 2006/0112436 A1 * | 5/2006 | Modave ..................... 726/34 |
| 2007/0033419 A1 | 2/2007 | Kocher et al. |
| 2008/0037781 A1 | 2/2008 | Kocher et al. |
| 2008/0049935 A1 | 2/2008 | Kocher et al. |
| 2008/0101604 A1 | 5/2008 | Kocher et al. |
| 2008/0130886 A1 | 6/2008 | Kocher et al. |
| 2008/0133938 A1 | 6/2008 | Kocher et al. |
| 2008/0137848 A1 | 6/2008 | Kocher et al. |
| 2010/0284539 A1 * | 11/2010 | Roy et al. .................. 380/278 |
| 2011/0191647 A1 * | 8/2011 | Miller et al. ............... 714/748 |

OTHER PUBLICATIONS

U.S. Appl. No. 12/625,864, filed Nov. 25, 2009, Jenkins, IV, Jesse H., Xilinx, Inc. 2100 Logic Drive, San Jose, CA 95124 USA.

Cryptography Research, DPA Licensing, Patent and Technology Licensing, pp. 1-5, Nov. 20, 2009, http://www.cryptography.com/technology/dpa/licensing.html.

Xilinx, Inc. "Virtex-5 FPGA Configuration User Guide", UG191 (v3.9.1) Aug. 20, 2010, Chapter 6, pp. 1-166, www.xilinx.com, Xilinx, Inc., 2100 Logic Drive, San Jose, CA, US.

* cited by examiner

METHOD AND INTEGRATED CIRCUIT FOR PROTECTING AGAINST DIFFERENTIAL POWER ANALYSIS ATTACKS

FIELD OF THE INVENTION

An embodiment of the present invention generally relates to encryption, and more particularly to the encryption of data used to configure programmable resources.

BACKGROUND

Programmable logic circuits are integrated circuits (ICs) that are user configurable and capable of implementing digital logic operations. There are several types of programmable logic ICs, including Complex Programmable Logic Devices (CPLDs) and Field Programmable Gate Arrays (FPGAs). CPLDs include function blocks based on programmable logic array (PLA) architecture and programmable interconnect lines to route and transmit signals between the function blocks. FPGAs include configurable logic blocks (CLBs) arranged in rows and columns, input output blocks surrounding the CLBs, and programmable interconnect lines that route and transmit signals between the CLBs. Each CLB includes look-up tables and other configurable circuitry that is programmable to implement a logic function. The function blocks of CPLDs, CLBs of FPGAs and interconnect lines are configured by data stored in a configuration memory of the respective devices.

Designs implemented in programmable logic have become complex. Due to the time and investment required for design and debugging, it is desirable to protect the design from unauthorized copying. Efforts have been made to encrypt designs and provide the encrypted designs to the target devices. Several encryption algorithms, for example, the standard Data Encryption Standard (DES) and the more secure Advanced Encryption Standard (AES) algorithms, are known for encrypting blocks of data. Additionally, a one-time encryption pad may be used as a cipher for encrypting blocks of data by XORing blocks of data with blocks of the one-time pad (OTP). These approaches require provision of a key, corresponding to the particular encryption algorithm, and the key must be protected from unauthorized discovery.

A decryption key can be stored in nonvolatile memory of a programmable integrated circuit. An encrypted bitstream can then be loaded into the IC and decrypted using the key within the programmable logic. This prevents an attacker from reading the bitstream as it is being loaded into the programmable logic IC. However, this structure must also protect from modes of attack in which the attacker attempts to obtain the decryption key stored in the programmable IC. If the attacker obtains the decryption key, the attacker can decrypt an intercepted bitstream to reveal the unencrypted design.

One method through which an attacker may attempt to discover the decryption key is known as power analysis. In a power analysis attack, current used by a device is monitored while the device is decrypting the bitstream. During normal operation, the amount of power used by a device varies depending on the logic gates activated at a given time. By monitoring variations in the power consumption while the device is decrypting a configuration bitstream, the attacker can identify decryption operations performed and determine the decryption key. In another type of attack, an attacker attempts to guess a key, password or authentication code using many trial-and-error attempts. The attacker may attempt to determine the key value or force the device to accept tampered data as if it were legitimate.

One or more embodiments of the present invention may address one or more of the above issues.

SUMMARY

In one embodiment of the invention, a method is provided for protecting against attacks on security of a programmable integrated circuit (IC). At least a portion of an encrypted bitstream input to the programmable IC is decrypted with a cryptographic key stored in the programmable IC. A number of failures to decrypt the encrypted bitstream is tracked. The tracked number is stored in a memory of the programmable IC that retains the number across on-off power cycles of the programmable IC. In response to the number of failures exceeding a threshold, data that prevents the decryption key from being used for a subsequent decryption of a bitstream is stored in the programmable IC.

In another embodiment, a programmable integrated circuit (IC) is provided. The programmable IC includes: configuration memory, programmable resources coupled to the configuration memory, programmable interconnection resources coupled to the configuration memory and the programmable resources, and a configuration controller circuit coupled to the configuration memory. The configuration controller circuit is configured to decrypt input configuration data using a cryptographic key stored in a non-volatile memory of the programmable IC and program the configuration memory with the decrypted input configuration data. The configuration controller tracks a number of failures to decrypt the encrypted bitstream in a non-volatile memory of the programmable IC. In response to the number of failures exceeding a threshold, the programmable IC stores data that prevents the cryptographic key from being used for a subsequent decryption of a bitstream in the programmable IC.

In yet another embodiment, an article of manufacture is provided. The article is characterized by a processor-readable non-transitory storage medium configured with processor-executable instructions for processing a circuit design. The instructions when executed by a processor cause the processor to decrypt at least a portion of an encrypted bitstream input to the programmable IC with a cryptographic key stored in the programmable IC. The instructions additionally cause the processor, in response to completing decryption of the encrypted bitstream, to authenticate the decrypted bitstream. The instructions further cause the processor to track a number of failures to decrypt and authenticate the encrypted bitstream in a memory of the programmable IC that retains the number of failures across on-off power cycles of the programmable IC. The instructions additionally cause the processor, in response to the number of failures exceeding a threshold, to store data that prevents the cryptographic key from being used for a subsequent decryption of a bitstream in the programmable IC.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION OF THE DRAWINGS

During configuration of programmable logic, the configuration bitstream data can be intercepted and used to make unauthorized copies of the design, unless the bitstream is encrypted. Although the configuration bitstream can be encrypted, the decryption key may be vulnerable to discovery through power analysis. During normal operation, the amount of power used by a device varies depending on the logic gates activated at a given time. In a differential power analysis attack, current used by a device is monitored over time and analyzed to identify decryption operations and determine the decryption key. However, a differential power analysis attack requires a large number of repeated decryptions to gather sufficient data for performing statistical analysis. Other attacks, called repeated-configuration attacks use a large number of repeated decyrptions or configurations to determine a secret value, determine a decryption key or force the FPGA to accept tampered data as legitimate. One or more embodiments of the present invention prevent DPA data gathering or repeated-configuration attacks by detecting failed configurations and responding with countermeasures to obstruct further DPA data gathering.

Programmable ICs are typically implemented alongside an external non-volatile configuration memory. When the programmable IC is powered on, a configuration bitstream is read from the external memory into the programmable IC. To prevent an attacker from intercepting the bitstream, encryption is commonly employed.

The following description uses an FPGA as an example of a programmable IC that may be targeted by an attacker for differential power analysis. Use of an FPGA in the description is for ease of description. Those skilled in the art will recognize that the teachings are not limited to FPGAs and may be applied to various other types of integrated circuits.

Figure 1:
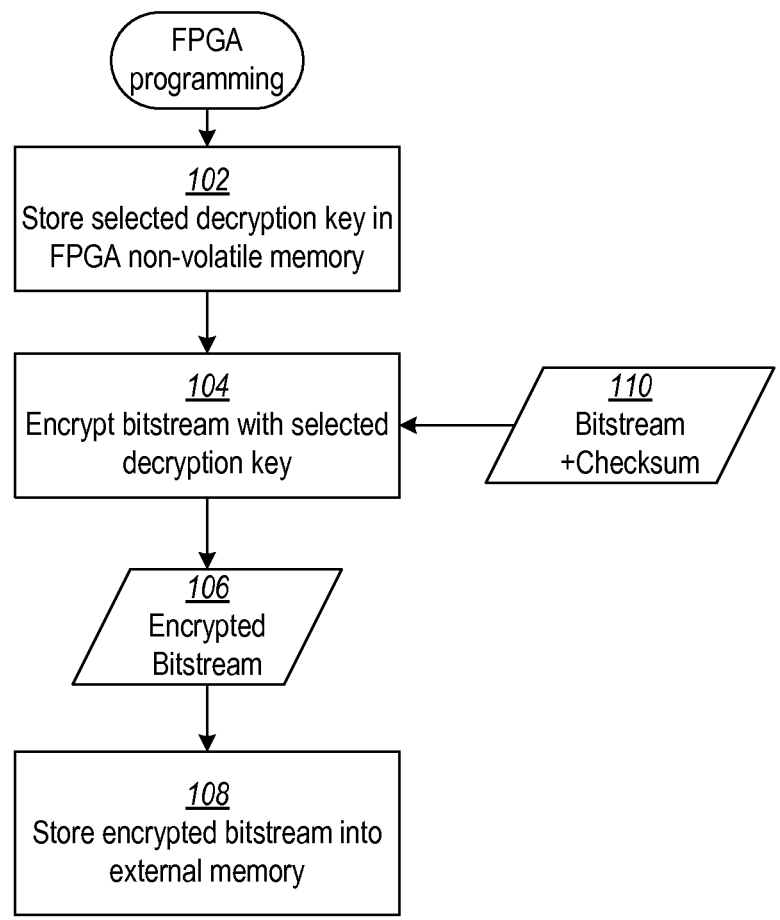
FIG. 1 shows a flowchart of an example process for configuration of programmable logic using encrypted bitstreams.

FIG. 1 shows a flowchart of an example process for configuring an FPGA system with an encrypted bitstream. A developer configures an FPGA to store a selected decryption key in an internal non-volatile memory at step 102. A bitstream of a design and a checksum 110 of the bitstream are encrypted with a key corresponding to the selected decryption key at step 104. The encrypted bitstream 106 is stored in an external non-volatile memory at step 108. At startup, the encrypted bitstream is retrieved from the external memory, decrypted within the programmable IC, and used for configuration of the programmable logic within. Although this method prevents an attacker from reading the bitstream directly, it may be possible for the decryption key to be retrieved through a process known as power analysis. It may also be possible for an attacker to determine a key or force the FPGA to accept a tampered bitstream by repeated-configuration attack.

In a simple power analysis (SPA) attack, current used by a device is monitored over time. During normal operation, the amount of power used by a device varies depending on the logic gates activated at a given time. By monitoring variations in the power consumption, the attacker can identify different decryption operations that are performed during startup configuration. For example, if a programmable IC implements DES encryption, sixteen rounds of encryption/decryption are performed on each block of data. Because similar operations are performed for each round, power consumption data can be identified for each round. Comparison of power consumption of different rounds can identify key dependent operations and, ultimately, the key used for decryption. For example, the DES key schedule is produced by rotating 28-bit key registers. The rotations are generally implemented using a right shift operation where a zero is shifted into the most significant bit by default. If the bit of the key shifted out of the register is a one, an additional operation is needed to cause the most significant bit to be equal to one. Therefore, a different power signature will be produced for each rotation depending on the bit of the decryption key. As used herein, a power signature may be referred to as power fluctuations, a power consumption signature, or a power consumption waveform, and such terms may be used interchangeably herein. Other encryption ciphers, including both symmetric and asymmetric ciphers, also include key dependent operations that may be susceptible to power analysis.

In one example countermeasure, random noise is generated and added to modulate a power consumption waveform and conceal key dependent processes. However, even when the magnitude of the variations in power consumption are small in comparison to other power signals or noise, power variations of each operation can be detected and isolated using frequency filters and statistical analysis. This is known as differential power analysis (DPA). In DPA, a large number of data samples are gathered by monitoring power variations while decrypting a large number of input values. In one type of attack, the attacker generally will decrypt only a small number of values (i.e. a subset of the configuration bitstream) and then restart the programmable IC to initiate the next cycle. The attacker repeats the restart-decrypt cycle as many times as is needed to gather sufficient data for performing differential power analysis. The restart-decrypt cycle may also be used by an attacker to guess secret data, a decryption key, a password or authentication code to force the FPGA to accept tampered data as legitimate.

One or more embodiments of the present invention detect failed configuration attempts and take countermeasures to prevent subsequent DPA data gathering operations. In one embodiment of the present invention, failed configurations are detected by tracking the number of failed decryptions and/or configurations. As used herein, failed decryptions and/or configurations may be referred to as incomplete decryptions and/or configurations, failed decryptions, or failed configurations and such terms may be used interchangeably herein. When the number of failed decryptions/configurations becomes greater than a selected threshold, failed configurations are detected and countermeasures are taken. In this embodiment, information indicating that a decryption process was initiated is stored in non-volatile memory at the start of the decryption/configuration process. If decryption/configuration completes successfully, the stored information is removed. In this manner, the stored information can be analyzed at startup to determine if the previous decryption/configuration completed successfully.

Figure 2:
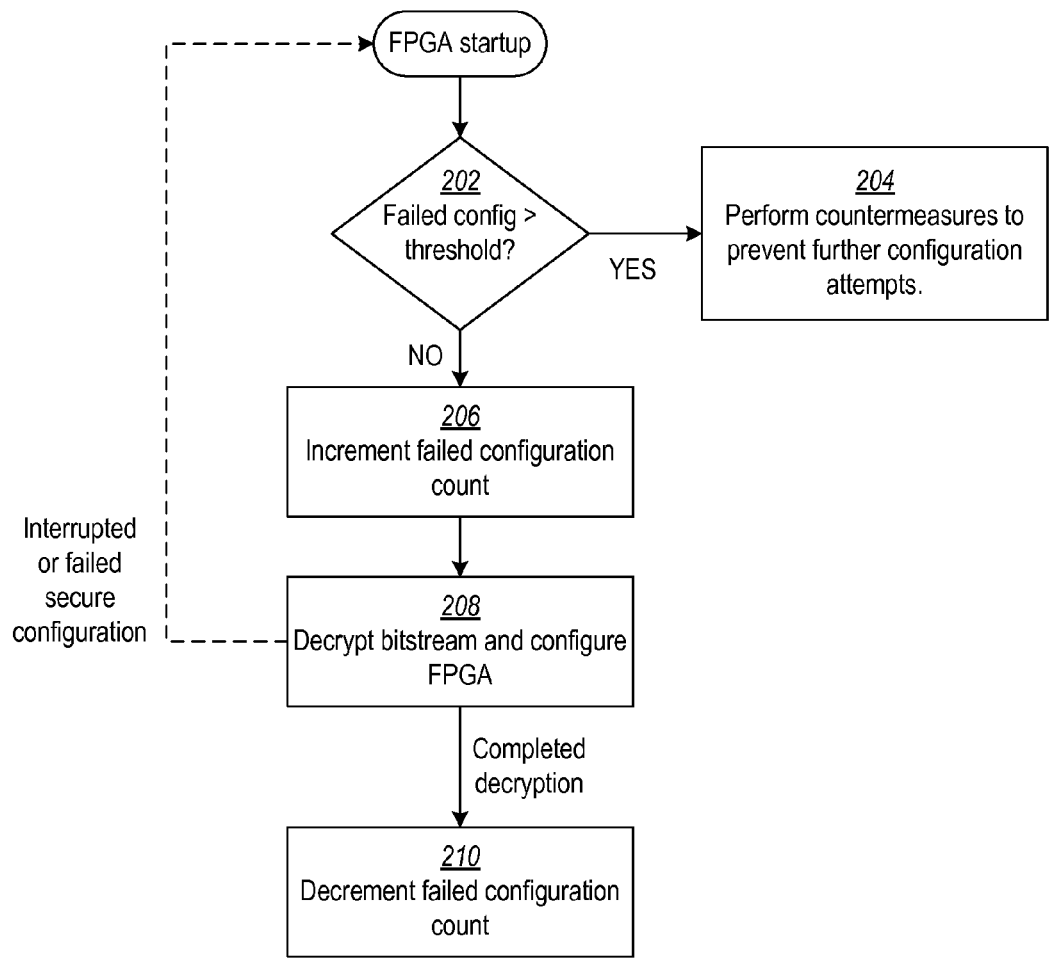
FIG. 2 shows a flowchart of an example process for detecting power analysis data gathering during startup configuration of programmable logic.

FIG. 2 shows a flowchart of an example process for configuring an FPGA at startup with an encrypted bitstream in accordance with one or more embodiments of the invention. At startup, the FPGA checks to see if the number of failed configurations exceeds a selected threshold. In the implementation shown in this example, failed configurations are tracked using a counter indicating the number of failed configurations. The FPGA checks the number of failed configurations stored in non-volatile memory at decision step 202. Non-volatile memory is preferred since it is not cleared when power is turned off. Non-volatile memory may be one-time programmable, such as fuse or anti-fuse memory; it may be reprogrammable such as flash memory, or may use data-remanence techniques. If the count does not exceed a selected threshold, the failed attempt count is incremented at step 206. The encrypted bitstream is decrypted at step 208. If decryption and configuration complete successfully, the failed attempt count is decremented to restore the previous value at step 210. If an attacker interrupts the decryption and configuration process, the interruption may cycle the power to the FPGA before the stored indication of the failed configuration can be removed in step 210.

After all of the number of failed configurations exceeds the selected threshold, as determined at decision step 202, countermeasures are taken to prevent further attempts to configure the FPGA with the decryption key at step 204. In one embodiment, the FPGA may be disabled.

It is recognized that an attacker need not use a valid bitstream to perform DPA and obtain the decryption key stored within the programmable IC. Because a bitstream is assumed to be valid during decryption, the programmable IC will attempt to decrypt an invalid bitstream using the decryption key. Therefore, an attacker may construct a short bitstream to reduce the time necessary for DPA data gathering. To detect the use of invalid bitstreams, in another embodiment, failed configurations are detected by authenticating each decrypted bitstream with a checksum or hash value. In one implementation, prior to encryption, a checksum is calculated and appended to the bitstream. When the decryption within the programmable IC has completed, the calculated checksum is compared to the checksum appended to the bitstream. If there is a discrepancy between the two checksums, a DPA attack may have been attempted even though the decryption-configuration process ran to completion (though unsuccessfully).

Figure 3:
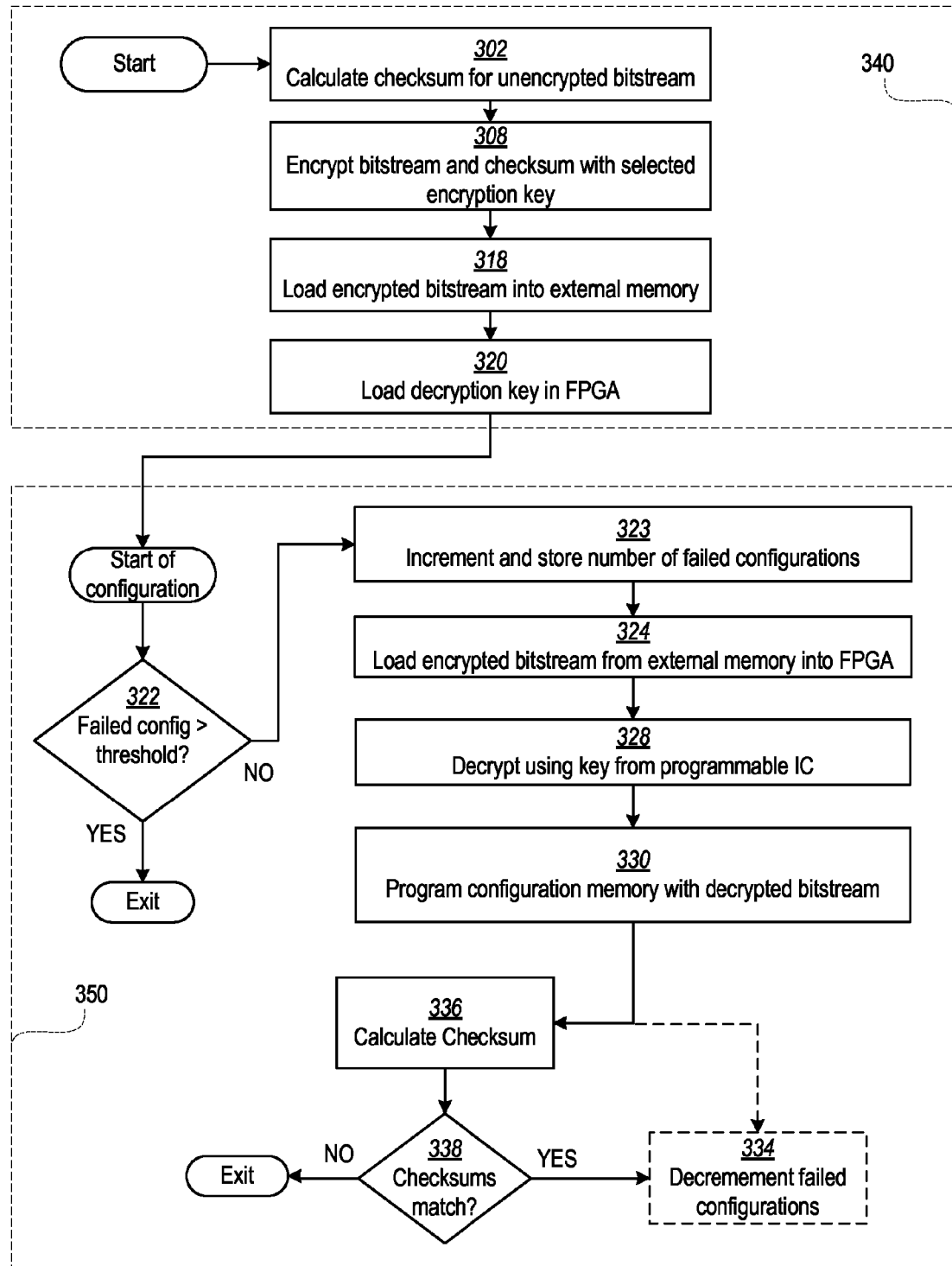
FIG. 3 shows a flowchart of an example process for encrypting a configuration bitstream, and in decrypting the bitstream detecting power analysis data gathering in accordance with various embodiments of the invention.

FIG. 3 illustrates a flowchart of an example process for protecting against differential power analysis attacks or repetitive-configuration attacks in accordance with one or more embodiments of the invention. In this example, DPA data gathering is detected by tracking incomplete configurations and tracking decrypted bitstreams that have failed authentication. Authentication may also be referred to as verification or data integrity checks and such terms are used interchangeably herein.

Bitstream creation and transfer to an FPGA are shown by block 340. A checksum of the unencrypted bitstream is calculated and appended to the bitstream at step 302. The bitstream, including the checksum, is encrypted with a selected encryption key at step 308. The bitstream is loaded into a memory external to the FPGA at step 318. A decryption key corresponding to the encryption key is loaded into an internal non-volatile memory of the FPGA at step 320. Depending on the cryptographic cipher implemented, the decryption key may be the same as or different from the encryption key used in step 308.

Block 350 illustrates the process of decrypting and configuring the FPGA with the encrypted bitstream at startup of the FPGA. The number of failed configurations in the non-volatile memory in the FPGA is compared to a selected threshold at decision step 322. If the number of failed configurations is less than the threshold, the FPGA proceeds with decryption and configuration. The tracked number of failed configurations is incremented and stored at step 323. The encrypted bitstream is loaded from the external memory into the FPGA at step 324. As the encrypted bitstream is decrypted using the decryption key stored in the FPGA at step 328, the decrypted bitstream is used to program frames of configuration memory located at the addresses indicated in the decrypted bitstream at step 330.

In one implementation, when the end of the bitstream is reached following step 330, the number of failed configurations is decremented at step 334 to restore the previously failed configuration count. If an attacker cycles the power to the FPGA and thereby prevents decryption and configuration from completing, the number of failed configurations will not be decremented at step 334. In this manner, incomplete configurations are tracked, as shown in FIG. 2.

In another implementation, a checksum of the decrypted bitstream is calculated at step 336 and compared at decision step 338 to the checksum indicated in the bitstream for verification. If checksums match, the number of failed configurations is decremented at step 334 to restore the previous failed configuration count. In this manner, both incomplete configurations and bitstreams failing verification are tracked together. In this implementation, the failed configuration count represents incomplete configuration attempts as well as completed configurations which failed authentication. When the number failed configurations exceeds the specified threshold at decision step 322 during startup, the system infers that DPA data gathering has occurred or a repetitive-configuration attack us underway and further decryption-configuration is prevented.

Figure 4:
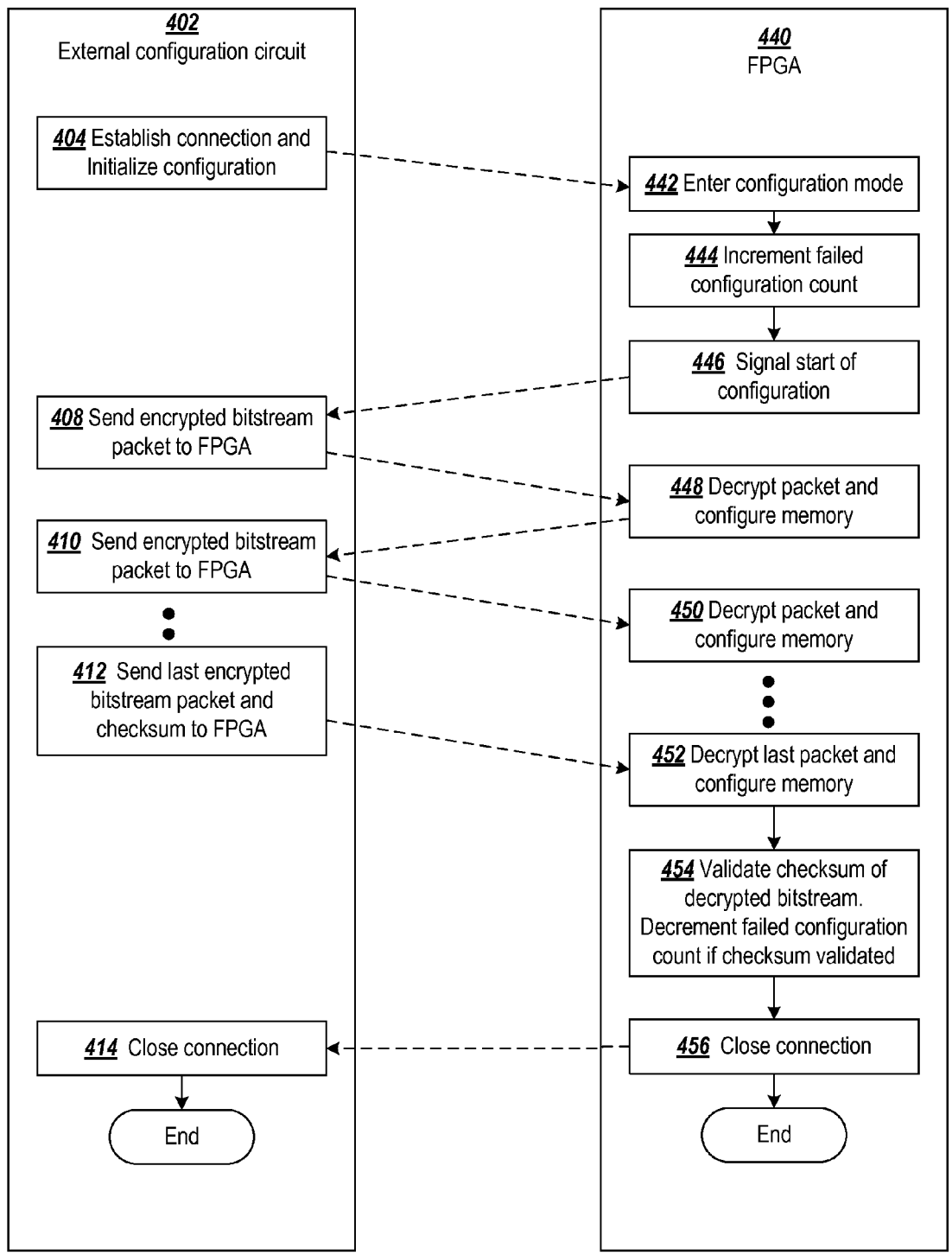
FIG. 4 illustrates an example process for configuration of programmable logic at startup in accordance with several embodiments of the invention.

FIG. 4 is a flowchart of a process performed by an external configuration circuit and an FPGA during encrypted configuration in accordance with one or more embodiments of the invention. External configuration circuit 402 establishes a connection to FPGA 440 and initiates a configuration mode at step 404. In response, FPGA 440 enters configuration mode at step 442, increments the failed configuration count at step 444, and signals the external configuration circuit to begin configuration at step 446. In response, external configuration circuit 402 sends encrypted bitstream packets to FPGA 440 at steps 408, 410, and 412. In response to each encrypted bitstream packet, FPGA 440 decrypts the packets and configures memory of the FPGA at steps 448, 450 and 452. The last packet 412 includes an expected checksum of the complete bitstream. When the last packet is received at step 452, FPGA 440 validates the checksum of the decrypted bitstream at step 454. If the checksum is authorized, the failed configuration count is decremented. The connection is closed at steps 456 and 414.

A number of different countermeasures may be taken to prevent further decryption with the decryption key. In one embodiment, configuration is aborted whenever the failed configuration count exceeds the specified threshold at startup as shown in FIG. 3. In another embodiment, the decryption key is modified or deleted so further decryption and configuration attempts will leak information based on a different key. In another embodiment, a key selection circuit may be employed to use an alternative key for decryption whenever the failed configuration count exceeds the specified threshold. In yet another embodiment, the decryption key may be encrypted with itself or another key value. Those skilled in the art will recognize that other methods may be used to modify the key in response to detecting a number of failed configurations.

In some embodiments of the present invention, the programmable IC may be reconfigured by the user to re-enable decryption and configuration with the original decryption key after countermeasures have been employed. In one example implementation, if the countermeasure does not modify the decryption key, a specified reset command may be used to reset the failed configuration count and/or re-enable configuration. In another implementation, configuration may be disabled by encrypting the decryption key with a specified value. In this implementation, the reset command may contain a second decryption key to restore the value of the decryption key. Those skilled in the art will recognize that other methods may be used to restore the decryption key and re-enable configuration depending on the countermeasures taken in response to detecting a number of failed configuration.

In the above examples, countermeasures are not triggered until a selected number of failed configurations has occurred. The threshold number of failed configurations that is selected by a user may depend on a number of environmental factors. The highest level of security is achieved by triggering countermeasures after one failed configuration. However, a configuration may fail to complete for reasons other than DPA data gathering. For example, in operating environments with a high level of electromagnetic noise, configuration may fail because an error occurred during transmission of the bitstream to the programmable IC. If transmission errors are expected to occur often, a higher number of failed configurations may be desired. Another factor that may be considered is the serviceability of the programmable IC. If the IC is expected to be deployed in a remote location with high service or reliability costs, such as aerospace applications, a higher number of failed configurations may be desired. Another consideration is the length of the valid bitstream that is intended to be used for configuration in authorized operation. Different programmable ICs have different numbers of programmable resources. These devices, therefore, will require bitstreams of different lengths to configure the programmable resources. If shorter bitstreams are used, less time is needed to complete decryption and configuration. Therefore, less time is needed to perform each round of DPA data gathering. As a consequence, a vendor may wish to use a lower threshold when a short bitstream will be used.

The embodiments of the present invention may also be used alone or in combination with other DPA mitigation techniques such as random noise generation, signal to noise reduction, or clock skipping. Also any number of block or stream encryption algorithms may be used to encrypt and decrypt bitstream frames including, XOR, DES, AES, TEA, Blowfish, RSA, etc.

Figure 5:
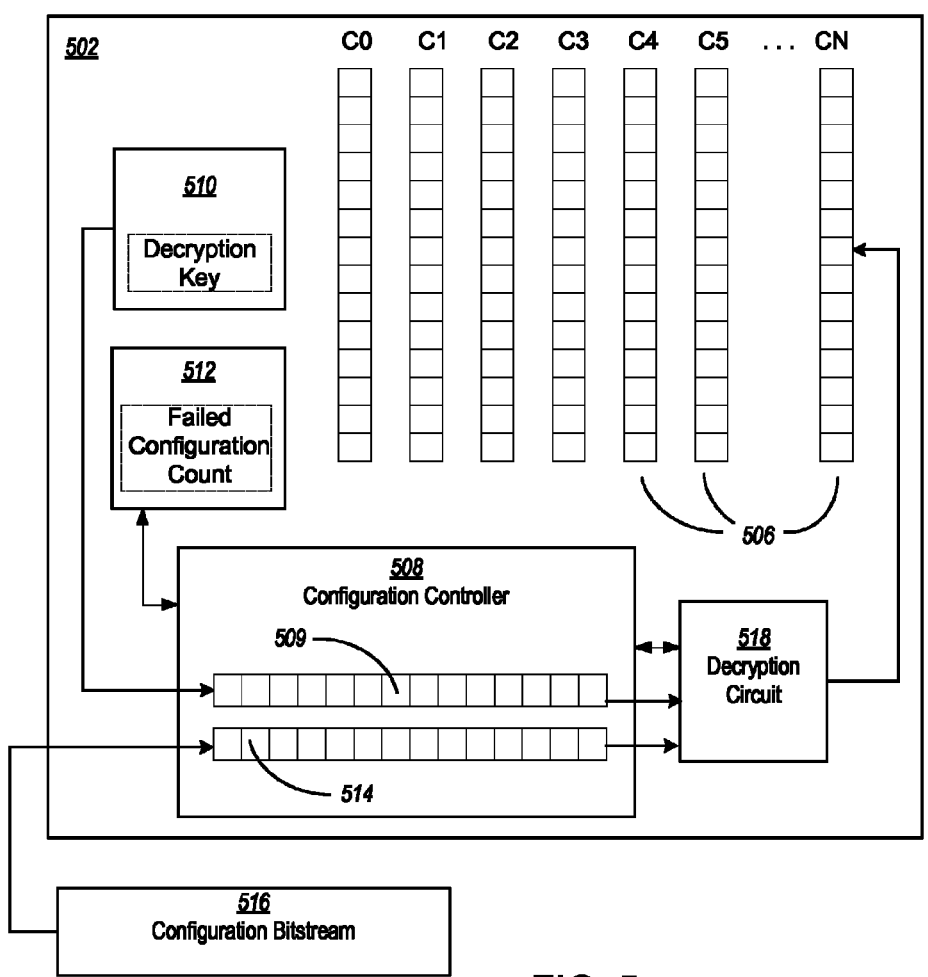
FIG. 5 shows a block diagram of an FPGA with configuration circuitry for decrypting encrypted bitstream frames.

FIG. 5 illustrates a block diagram of a programmable IC such as, e.g., programmable logic IC 502 configured in accordance with several embodiments of the invention. Programmable logic IC 502 includes configuration memory frames 506, a non-volatile memory 510 that stores a decryption key, a decryption circuit 518, a configuration controller 508, programmable logic resources (not shown), and programmable interconnection resources (not shown). The configuration controller 508 is equipped with a key buffer 509 and a bitstream frame buffer 514. The decryption key is read into key buffer 509. Frames of configuration data are read into the programmable logic IC 502 from the configuration bitstream 516, and each frame of configuration data is placed into the bitstream frame buffer 514. The data in the buffers are shifted into a decryption circuit 518. The decrypted frame is then stored in the configuration memory frame 506 at the proper destination address. Prior to decrypting, the configuration controller 508 increments the failed configuration count stored in non-volatile memory 512. If decryption and configuration complete successfully, the configuration controller 508 decrements the failed configuration count stored in the non-volatile memory 512.

Figure 6:
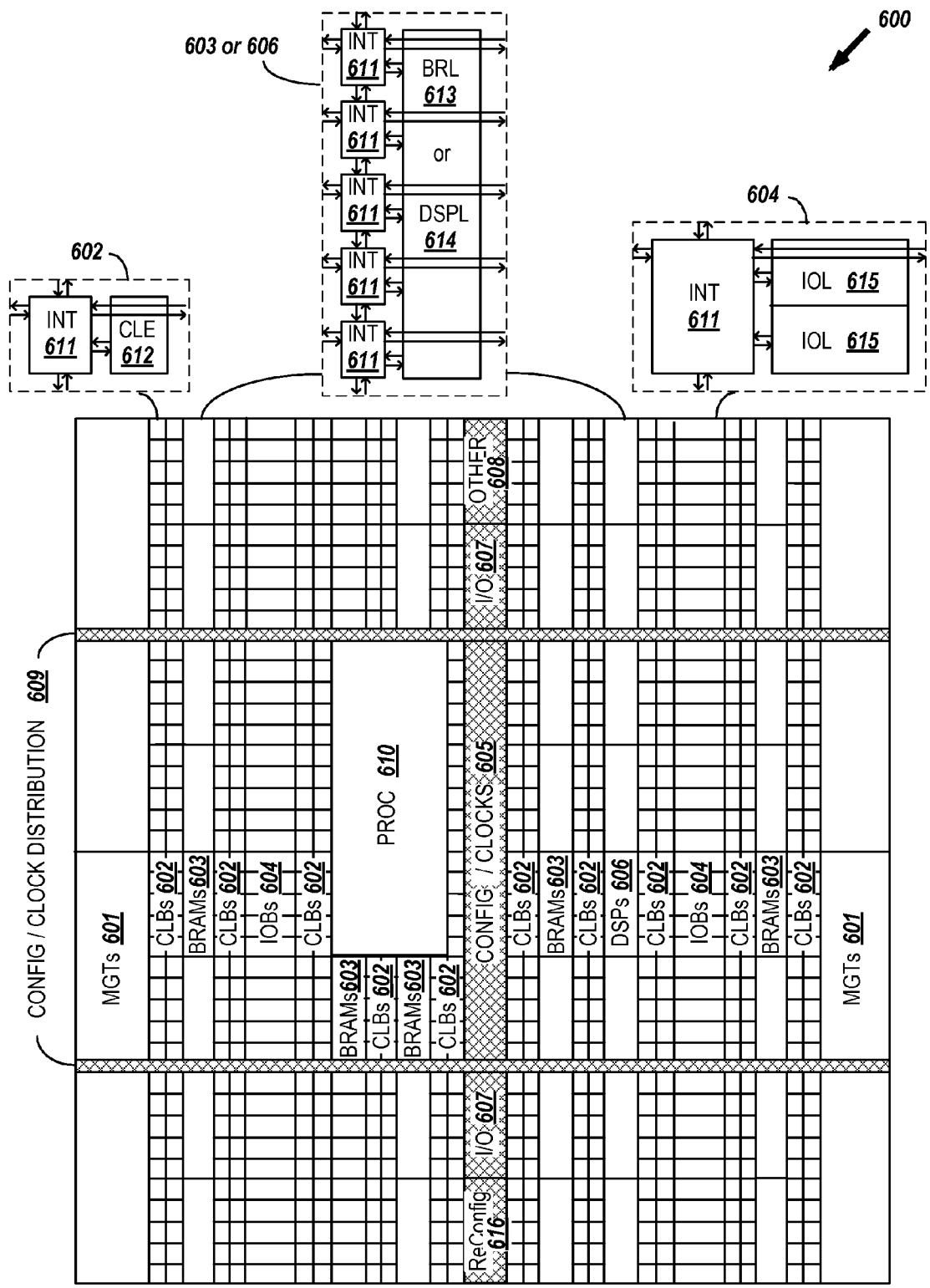
FIG. 6 illustrates a block diagram of a programmable integrated circuit for implementing programmable logic in accordance with various embodiments of the invention.

FIG. 6 is a block diagram of an example field programmable gate array (FPGA) which is configurable in accordance with one or more embodiments of the invention. FPGAs can include several different types of programmable resources such as programmable logic blocks in the array. For example, FIG. 6 illustrates an FPGA architecture 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, a reconfiguration port (RECONFIG) 616, specialized input/output blocks (I/O) 607, for example, clock ports, and other programmable logic 608 such as digital clock managers, analog-to-digital converters, system monitoring logic, and so forth. Some FPGAs also include dedicated processor blocks (PROC) 610.

In some FPGAs, each programmable tile includes a programmable interconnect resource element (INT) 611 having standardized connections to and from a corresponding interconnect element in each adjacent tile. Therefore, the programmable interconnect resource elements taken together implement the programmable interconnect structure for the illustrated FPGA. The programmable interconnect resource element INT 611 also includes the connections to and from the programmable logic element within the same tile, as shown by the examples included at the top of FIG. 6.

For example, a CLB 602 can include programmable resources such as, e.g., a configurable logic element CLE 612 that can be programmed to implement user logic plus a single programmable interconnect resource element INT 611. A BRAM 603 can include a BRAM logic element (BRL) 613 in addition to one or more programmable interconnect resource elements. Typically, the number of interconnect elements included in a tile depends on the height of the tile. In the pictured embodiment, a BRAM tile has the same height as four CLBs, but other numbers (e.g., five) can also be used. A DSP tile 606 can include a DSP logic element (DSPL) 614 in addition to an appropriate number of programmable interconnect resource elements. An IOB 604 can include, for example, two instances of an input/output logic element (IOL) 615 in addition to one instance of the programmable interconnect resource element INT 611. As will be clear to those of skill in the art, the actual I/O pads connected, for example, to the I/O logic element 615 are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the FPGA.

Some FPGAs utilizing the architecture illustrated in FIG. 6 include additional logic blocks that disrupt the regular columnar structure making up a large part of the FPGA. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/ logic implementations included at the top of FIG. 6 are purely exemplary. For example, in an actual FPGA more than one adjacent column of CLBs is typically included wherever the CLBs appear, to facilitate the efficient implementation of user logic.

One or more embodiments of the present invention is thought to be applicable to a variety of systems for encrypted configuration of programmable IC. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method for protecting against attacks on security of a programmable integrated circuit (IC), comprising:
    prior to initiating decryption of an encrypted bitstream input to the programmable IC, adjusting a tracking number in a non-volatile memory to indicate failure to decrypt the encrypted bitstream, the non-volatile memory retaining the number across on-off power cycles of the programmable IC;
    attempting to decrypt at least a portion of an encrypted bitstream input to the programmable IC with a cryptographic key stored in the programmable IC;
    in response to completing decryption of the encrypted bitstream:
        calculating a first checksum of the decrypted bitstream;
        comparing the first checksum to a second checksum in the decrypted bitstream;
        in response to the first checksum matching the second checksum, adjusting the tracking number in the non-volatile memory to indicate successful decryption of the encrypted bitstream; and
        in response to the first checksum not matching the second checksum, bypassing adjustment of the tracking number in the non-volatile memory to indicate unsuccessful decryption of the encrypted bitstream; and
    in response to the number of failures exceeding a threshold, storing data that prevents the cryptographic key from being used for a subsequent decryption of the encrypted bitstream in the programmable IC.

2. The method of claim 1, wherein:
    the adjusting of the tracking number prior to initiating decryption includes decrementing the tracking number; and
    the adjusting of the tracking number in response to the first checksum matching the second checksum includes incrementing the tracking number.

3. The method of claim 1, wherein the first checksum is calculated for the entire decrypted bitstream.

4. The method of claim 1, wherein the first checksum is calculated for a portion of the decrypted bitstream.

5. The method of claim 1, wherein the storing data that prevents the cryptographic key from being used for a subsequent decryption includes deleting the cryptographic key from the programmable IC.

6. The method of claim 1, wherein the storing data that prevents the cryptographic key from being used for a subsequent decryption includes modifying the cryptographic key.

7. The method of claim 6, wherein the modifying the cryptographic key includes:
    encrypting the cryptographic key using the encryption key; and
    storing the encrypted cryptographic key in the programmable IC.

8. The method of claim 1, wherein the storing data that prevents the cryptographic key from being used for a subsequent decryption includes storing data causing the programmable IC to use an alternate cryptographic key for the decrypting frames of the encrypted bitstream.

9. The method of claim 1, further comprising, in response to a user command, storing data to enable the disabled programmable IC.

10. The method as in claim 1, wherein the programmable IC is configured to prevent readout of configuration memory.

11. A programmable integrated circuit (IC) comprising:
    configuration memory;
    programmable resources coupled to the configuration memory;
    programmable interconnection resources coupled to the configuration memory and the programmable resources; and
    a configuration controller circuit coupled to the configuration memory, the configuration controller circuit configured to:
        prior to initiating decryption of an encrypted bitstream input to the programmable IC, adjust a tracking number in a non-volatile memory to indicate failure to decrypt the encrypted bitstream, the non-volatile memory retaining the number across on-off power cycles of the programmable IC;
        attempt to decrypt input configuration data using a cryptographic key stored in a non-volatile memory of the programmable IC;
        program the configuration memory with the decrypted input configuration data;
        in response to completing decryption of the encrypted bitstream:
            calculate a first checksum of the decrypted bitstream;
            compare the first checksum to a second checksum in the decrypted bitstream;
            in response to the first checksum matching the second checksum, adjust the tracking number in the non-volatile memory to indicate successful decryption of the encrypted bitstream; and
            in response to the first checksum not matching the second checksum, bypass adjustment of the tracking number in the non-volatile memory to indicate unsuccessful decryption of the encrypted bitstream; and
        in response to the number of failures exceeding a threshold, store data that prevents the cryptographic key from being used for a subsequent decryption of the input configuration data in the programmable IC.

12. The programmable IC of claim 11, wherein the storing of data that prevents the cryptographic key from being used for a subsequent decryption includes deleting the cryptographic key from the programmable IC.

13. The programmable IC of claim 11, wherein the storing of data that prevents the cryptographic key from being used for a subsequent decryption includes modifying the cryptographic key.

14. The programmable IC of claim 11, wherein the storing of data that prevents the cryptographic key from being used for a subsequent decryption includes:
    encrypting the cryptographic key using the cryptographic key; and
    storing the encrypted cryptographic key in the programmable IC.

15. The programmable IC of claim 11, wherein the storing of data that prevents the cryptographic key from being used for a subsequent decryption includes storing data causing the programmable IC to use an alternative cryptographic key for the decrypting frames of the input configuration data.

16. A system, comprising:
- a processor;
- a storage medium coupled to the processor and configured with processor-executable instructions for processing a circuit design, the instructions when executed by the processor causing the processor to:
- prior to initiating decryption of an encrypted bitstream input to the programmable IC, adjust a tracking number in a non-volatile memory to indicate failure to decrypt the encrypted bitstream, the non-volatile memory retaining the number across on-off power cycles of the programmable IC;
- attempt to decrypt at least a portion of an encrypted bitstream input to a programmable IC with a cryptographic key stored in the programmable IC;
- in response to completing decryption of the encrypted bitstream, authenticate the decrypted bitstream;
- in response to completing decryption of the encrypted bitstream:
  - calculate a first checksum of the decrypted bitstream;
  - compare the first checksum to a second checksum in the decrypted bitstream;
  - in response to the first checksum matching the second checksum, adjust the tracking number in the non-volatile memory to indicate successful decryption of the encrypted bitstream; and
  - in response to the first checksum not matching the second checksum, bypass adjustment of the tracking number in the non-volatile memory to indicate unsuccessful decryption of the encrypted bitstream; and
- in response to the number of failures exceeding a threshold, store data that prevents the cryptographic key from being used for a subsequent decryption of a bitstream in the programmable IC.

\* \* \* \* \*